Jan. 9, 1940. P. R. YOST 2,186,853
MILK COOLER
Filed Sept. 17, 1938 2 Sheets—Sheet 1
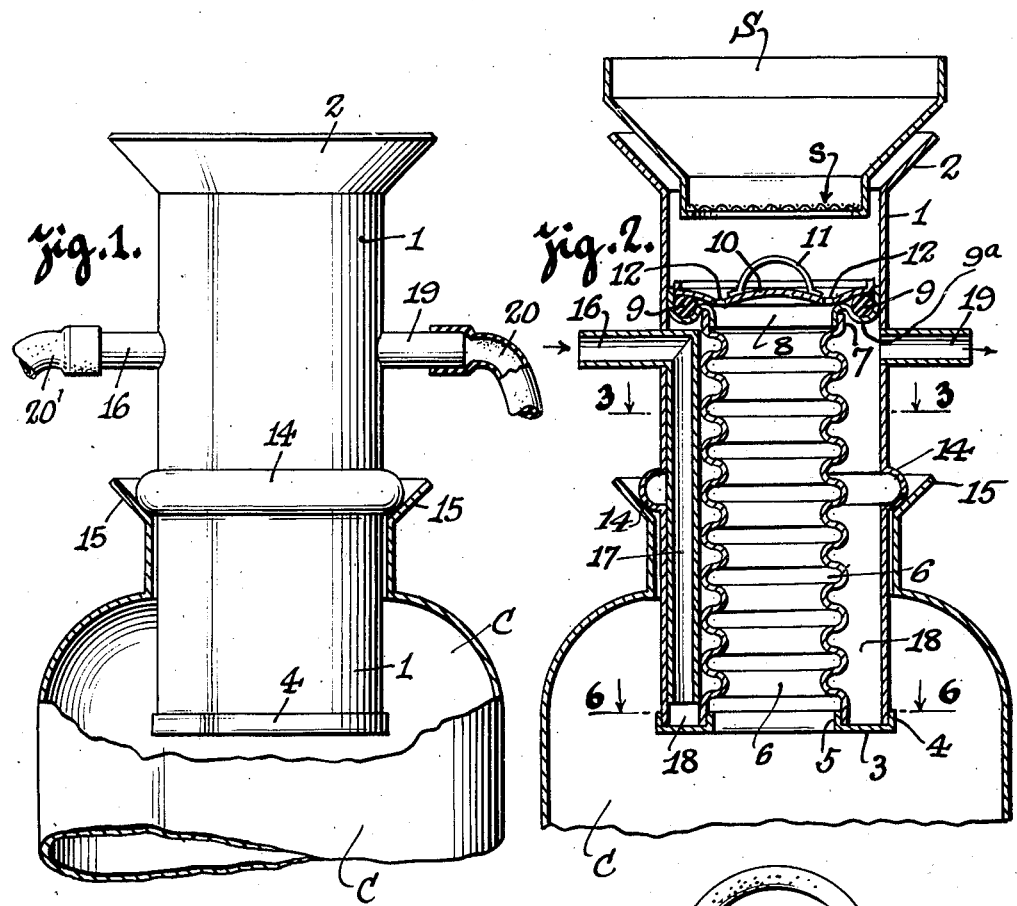
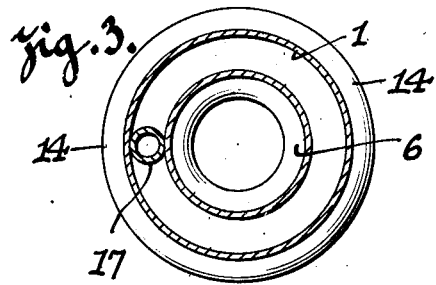
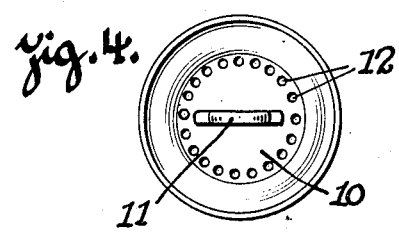
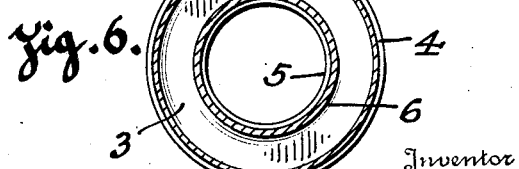
Inventor
P. R. Yost
By Lester L. Sargent
Attorney Jan. 9, 1940. P. R. YOST 2,186,853
MILK COOLER
Filed Sept. 17, 1938 2 Sheets-Sheet 2
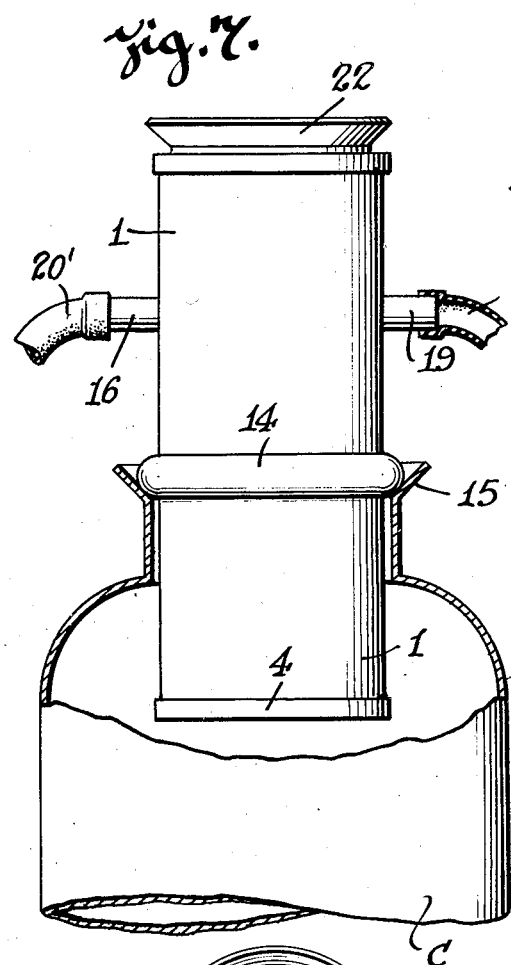
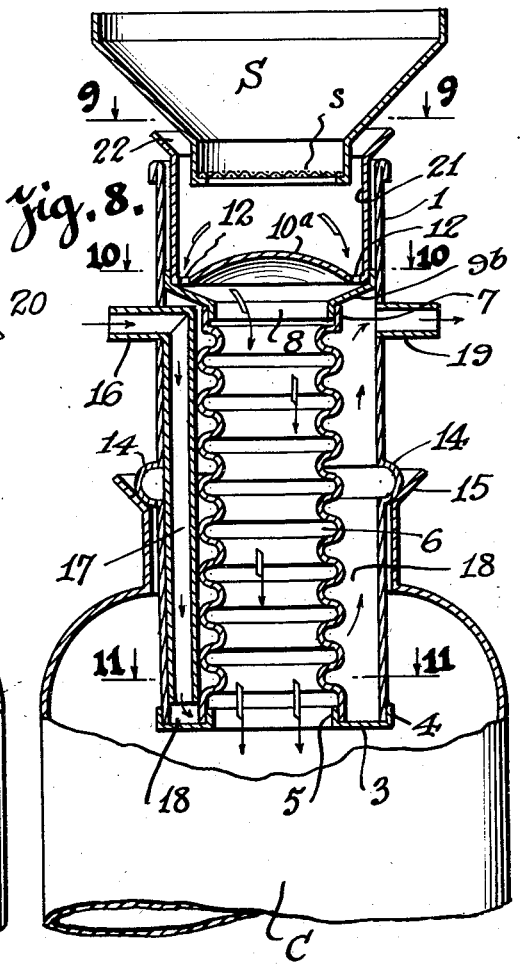
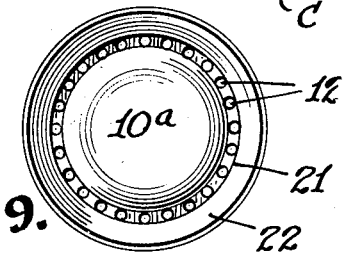
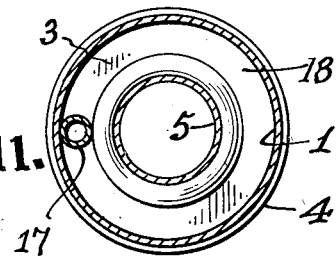
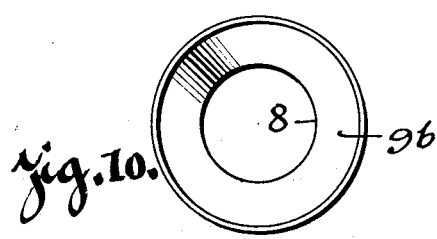
Inventor
P. R. Yost
By Lester R. Sargent
Attorney Patented Jan. 9, 1940

2,186,853

UNITED STATES PATENT OFFICE 2,186,853

MILK COOLER

Peter R. Yost, Goshen, Ind.

Application September 17, 1938, Serial No. 230,477

2 Claims. (Cl. 257—179)

The object of my invention is to provide a novel milk cooler for the use of milk producers to cool their milk while it is being strained into the can; to provide novel means for circulating water of a lower temperature than the milk around the neck of the cover, which is mounted in the neck of the can into which the milk is strained and poured; to provide a device of this character which can be manufactured at reasonable cost, and which will be efficient and easily applied to and removed from the ordinary large milk cans.

I attain these and other objects of my invention by the mechanism illustrated in the accompanying drawings, in which—

Figure 1 is a side elevation of the invention mounted in a milk can, a portion of the hose 20 being shown in section;

Fig. 2 is a vertical section through the invention;

Fig. 3 is a horizontal section on line 3—3 of Fig. 2;

Fig. 4 is a top plan view of the cover 10;

Fig. 5 is a detail plan view of ring 9;

Fig. 6 is a horizontal section on line 6—6 of Fig. 2;

Fig. 7 is a side elevation of an improved modification of the invention mounted in a milk can, a portion of the hose 20 being shown in longitudinal section;

Fig. 8 is a vertical section through the modified form of my invention;

Fig. 9 is a horizontal section on line 9—9 of Fig. 8;

Fig. 10 is a top plan view from the section line 10—10 of Fig. 8, this section line extending under member 10a, and Fig. 11 is a horizontal section on line 11—11 of Fig. 8.

Referring to the accompanying drawings, there is illustrated a conventional large milk can C, having a conventional flared neck 15. I provide a cylindrical jacket 1 having an outturned flange 2 to receive the approximately funnel-shaped strainer S, which has a wire sieve or strainer s. I provide an annular bottom member 3 having an upturned flange 4 engaging the jacket 1, and an upturned flange 5 engaging the lower end of a corrugated pipe 6, the corrugations of which may be disposed either in a parallel or horizontal direction, or disposed spirally. This corrugated pipe terminates at the top in the lip 7, which is engaged by an annular bracket 8 which is shaped to support a rubber ring or gasket 9, on which a perforated plate 10 is seated, plate 10 having annular spaced perforations 12, and a handle 11, affixed to the perforated plate 10. The function of the gasket 9 is to prevent milk from passing around the outer edge and under plate 10, so that it must pass through the annular spaced perforations 12, whereby to control the amount of milk passing over the cooling surface of the corrugated pipe 6. I provide an inlet tube 16 opening into the bottom of the jacket 1 and by which water is supplied to the chamber 18 which surrounds the jacket 1. A suitable outlet 19 opens out of the water space adjacent the upper end of the cooler 6, and a suitable rubber hose 20 may be attached to it, likewise a similar hose 20' is attached to the inlet tube 16. The jacket has an annular hollow rib or projection 14 adapted to seat on the flared neck 15 of the can C to support the cooler jacket in proper position in the mouth of the milk can, as shown in Figs. 1 and 2.

In operation, water is supplied through hose 20' and inlet tube 16 at the bottom of the cooler jacket and circulates around the cooler coils or corrugated pipes 6 and is discharged through the outlet tube 19. This constant circulation of cool water quickly cools the milk and the device is one that is easily operated.

Referring to Figs. 7–11, there is illustrated an improved form of my invention having a perforated plate 10a of convex shape with the spaced annular perforations 12 laterally the periphery of the plate, the plate being integral with the vertical cylindrical extension 21 seats within the cylindrical jacket 1, the member 21 having an annular outturned flange 22 on which the strainer may seat, as shown in Fig. 8. In this form of the invention, the gasket 9 is eliminated and in lieu thereof an annular member 9b is provided having its annular bracket or downturned annular flange 8 seated in the upper end of the corrugated pipe 6, as shown in Fig. 8, and the upper annular flange of member 9b being positioned between member 21 and member 1, as shown in Fig. 8. In other respects the construction and operation of this form of the invention is the same as shown in Figs. 1 and 2.

This construction permits of greater convenience in cleaning the mechanism and it lets the milk enter at a point where it will run slowly and evenly down over the corrugations to cool.

As shown in the drawings, applicant's cooler was purposely made to fit down into the milk can, its weight preventing it from becoming top-heavy and upsetting or being knocked over while in use and also avoiding lifting the milk so high to pour into the cooler as would be necessary with the cooler mounted on top of the can.

What I claim is:

1. In a milk cooler, the combination of a cylindrical jacket of suitable size to be inserted and extending down into the neck of a conventional large milk can, having a projection seating on the flared neck of the milk can, an annular bottom member having spaced upturned flanges, one of the said flanges being secured to the aforesaid jacket, a corrugated pipe mounted in the aforesaid jacket, a perforated plate seated on the top of the corrugated pipe, an inlet tube opening into the jacket adjacent the upper end of the corrugated pipe and terminating at a point close to the lower end of the corrugated pipe, and an outlet tube in the jacket opposite the inlet tube, each of said tubes being of suitable size for attachment to hose.

2. In a milk cooler, the combination of a cylindrical jacket of suitable size to be inserted and extending down into the neck of a conventional large milk can, an annular bottom member having spaced upturned flanges, one of the said flanges being secured to the aforesaid jacket, a corrugated pipe mounted in the aforesaid jacket, an annular bracket mounted on the upper end of said corrugated pipe, a gasket on said bracket, a perforated plate seated on the top of the corrugated pipe, an inlet tube opening into the jacket adjacent the upper end of the corrugated pipe and terminating at a point close to the lower end of the corrugated pipe, and an outlet tube in the jacket opposite the inlet tube, each of said tubes being of suitable size for attachment to hose.

PETER R. YOST.